No. 660,118. Patented Oct. 23, 1900.
S. D. McGUIRE.
CORN CULTIVATOR.
(Application filed July 27, 1900.)

(No Model.)

Witnesses
Jos. H. Blackwood
Powell Fred Gray

Squire D. McGuire
Inventor
by James K. Polk
Attorney

UNITED STATES PATENT OFFICE.

SQUIRE D. McGUIRE, OF GUILFORD, MISSOURI, ASSIGNOR OF ONE-HALF TO JEFFERSON C. HOCKER, OF SAME PLACE.

CORN-CULTIVATOR.

SPECIFICATION forming part of Letters Patent No. 660,118, dated October 23, 1900.

Application filed July 27, 1900. Serial No. 25,042. (No model.)

*To all whom it may concern:*

Be it known that I, SQUIRE D. MCGUIRE, a citizen of the United States, residing at Guilford, in the county of Nodaway and State of Missouri, have invented certain new and useful Improvements in Corn-Cultivators, of which the following is a specification.

My invention relates to improvements in corn-cultivators.

The object of my invention is to provide a cultivator which is very simple and inexpensive in construction and easy to operate, more especially for use when the corn is listed or is very small, which will pulverize or wash and smooth the clods, cultivate the corn close to the row, clean the ditch near the row, roll and stay the dirt, so that it will not cover up or break the corn by falling on the same, cut the weeds, and remove them from the ditch.

My invention consists in the features and combination of features, as more fully hereinafter described and claimed.

Figure 1:
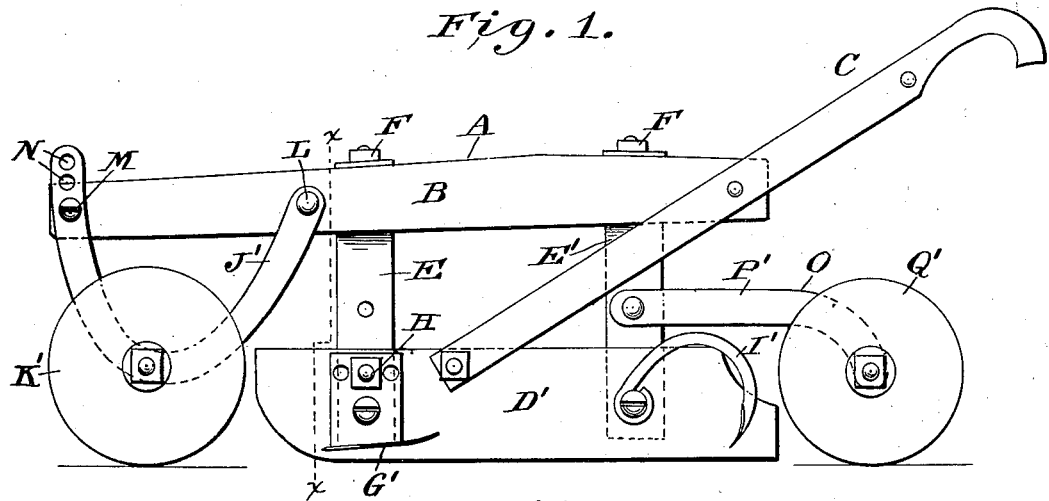
Figure 2:
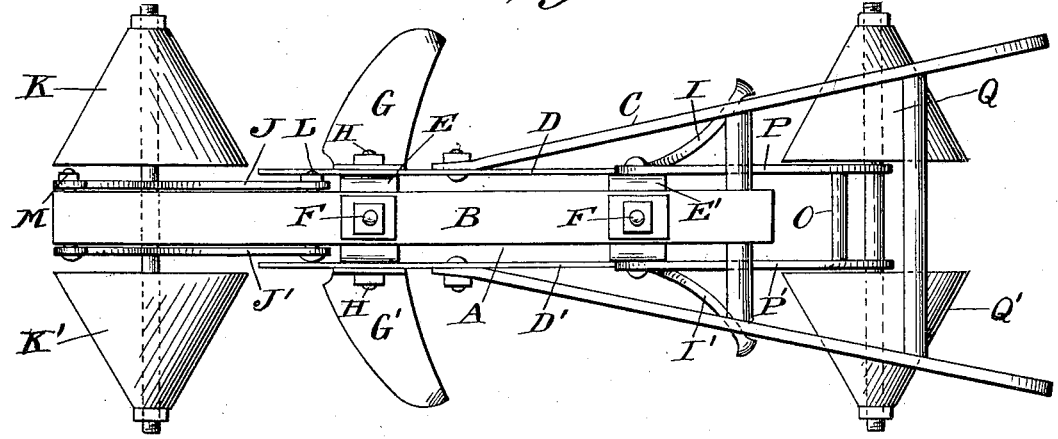
Figure 3:
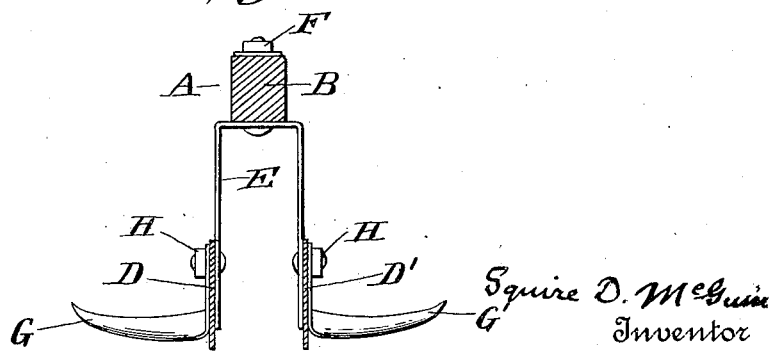

In the accompanying drawings, Figure 1 is a side elevation of my improved corn-cultivator; Fig. 2, a top plan view, and Fig. 3 a section on line $x\ x$ of Fig. 1.

Referring to the drawings, in which like letters of reference denote like parts throughout the several views, A represents my improved corn-cultivator; B, the beam; C, the handle, and D D' parallel runners which straddle the row of corn being cultivated and protect the same from injury. Said runners are provided with front and rear arches E E', attached to the under side of the beam by means of bolts and nuts F.

G G' are knives which are attached to the runners near their forward ends by means of bolts and nuts H and are adapted to cut the weeds on each side of the corn.

I I' are spring-teeth or arms secured to the outer sides of the runners near their rear ends for the purpose of catching, holding, and removing the weeds after they have been cut by the knives.

J J' are downwardly-extending brackets carrying wide conical-shaped rollers K K'. The rear ends of said brackets are pivoted to the beam B at L and the front ends secured to the said beam by a bolt and nut M and provided with a series of holes N to afford means for adjusting said bolt, and thereby adjusting said brackets to regulate the height of the rollers.

O is a gravity-clod pulverizing, rolling, and smoothing device comprising arms P P', the front ends of which are pivoted to the rear arch E' and the rear ends turned downward and carrying wide conical-shaped rollers Q Q'. The weight of the arm and roller keeps the rollers pressed downward on the ground, and they rise and fall by gravity, according to the nature of the ground traversed.

It will be seen that the runners straddling the row will effectually set up all listed corn, and by the use of the wide conical-shaped rollers the cultivator is prevented from going too deep into the ground and injuring the roots, especially where the ground is sandy or soft, and at the same time these rollers pulverize and crush all the clods.

The knives may, if desired, be provided with a slot in the shanks and be adjusted on the bolts H to afford means for their vertical adjustment.

The runners, arches, knives, spring-teeth, brackets, arms, &c., may be made of steel or any other suitable material.

The operation is as follows: The cultivator is adapted to straddle a row of corn with the knives and spring-teeth on each side of the same and the rollers resting on the ground, and when drawn over the field the knives cut the weeds between the rows, the spring-teeth catch and remove the weeds after they are cut by the knives, and the rollers pulverize and crush the clods and smooth the ground and pack the same, so that it will not fall onto and cover up or injure the corn.

I do not wish to be limited to the precise construction shown and described, as I may change the same somewhat without departing from the spirit of my invention.

Having thus described my invention, what I claim is—

1. A cultivator provided with a beam having front and rear arches attached to its under side, runners attached to the ends of said arches provided with knives and spring-teeth, and arms pivoted to said rear arch and provided with gravity-rollers, substantially as shown and described.

2. A cultivator comprising in combination a beam provided with rollers and front and rear arches, runners attached to the ends of said arches provided with knives and spring-teeth, and arms pivoted to said rear arch and provided with conical-shaped gravity-rollers, substantially as shown and described.

3. A cultivator provided with a beam having adjustable brackets carrying rollers and front and rear arches, runners attached to said arches provided with knives and spring-teeth, and arms one end pivoted to said rear arch and the opposite end bent downward and provided with conical-shaped gravity-rollers, substantially as shown and described.

In testimony whereof I hereunto affix my signature in presence of two witnesses.

SQUIRE D. McGUIRE.

Witnesses:
A. L. WHITFORD,
B. C. PARR.